United States Patent [19]

Tsurusaki et al.

[11] Patent Number: 5,105,461
[45] Date of Patent: Apr. 14, 1992

[54] TELEPHONE LINE INTERFACE CIRCUIT

[75] Inventors: Masayuki Tsurusaki, Hino; Setsuo Kimura, Musashimurayama, both of Japan

[73] Assignee: Kabushiki Kaisha Toshiba, Kawasaki, Japan

[21] Appl. No.: 521,330

[22] Filed: May 9, 1990

[30] Foreign Application Priority Data

May 9, 1989 [JP] Japan .................................. 1-115671

[51] Int. Cl.⁵ .................................................. H04M 1/00
[52] U.S. Cl. ................................... 379/382; 379/387; 379/359; 379/362
[58] Field of Search ................ 379/359, 362, 382, 387

[56] References Cited

U.S. PATENT DOCUMENTS

| 4,306,119 | 12/1981 | Kutzavitch | 379/362 |
| 4,527,016 | 7/1985 | Sublette | 379/359 |
| 4,736,412 | 4/1988 | Schmidt | 379/382 |
| 4,737,986 | 4/1988 | Tsunoda | 379/382 |
| 4,815,126 | 3/1989 | Goode et al. | 379/359 |
| 4,887,295 | 12/1989 | Jenkins | 379/362 |
| 4,935,959 | 6/1990 | Markovic et al. | 379/382 |

Primary Examiner—James L. Dwyer
Assistant Examiner—Jhancy Augustus
Attorney, Agent, or Firm—Foley & Lardner

[57] ABSTRACT

A telephone line interface circuit for connecting telephone equipment provided with internal speech lines having predetermined DC impedance to external telephone lines, comprising a rectifying circuit connected with the telephone lines for rectifying the DC voltage coming from the telephone lines; a dial pulse sending circuit which makes connection and disconnection between the output terminals of the rectifying circuit and the internal speech lines for sending dial pulses to the telephone lines; and a polarity inversion detecting circuit which discriminates th evoltage relationship between the telephone lines and the internal speech lines for detecting the polarity inversion of the DC voltage coming from the telephone lines.

5 Claims, 2 Drawing Sheets

TELEPHONE LINE INTERFACE CIRCUIT

BACKGROUND OF THE INVENTION

This invention relates to a telephone line interface circuit provided in telephone equipment.

FIG. 1 is the block diagram illustrating the configuration of the conventional telephone line interface circuit. In FIG. 1 an arrester circuit 4 is connected between telephone lines $L_1$ and $L_2$ to prevent the telephone equipment from the surge by thunder. A filter 1 is inserted into the telephone line $L_1$ and passes only the call signal of 16 Hz (75 V) among the signals sent in through the telephone lines $L_1$ and $L_2$. The changeover circuit 2 is driven when the telephone equipment is switched over from the call waiting state to the conversation state or from the conversation state to the call waiting state, has a fixed contact 2a connected to the input of the filter 1, the fixed contact 2b connected to the input of a call income detecting circuit 3 and a movable contact 2c connected to the output of the filter 1, and is controlled by a hook switching control signal A output from the controller 19.

During the call waiting state, that is, when the handset is on-hook, a contact 2b, as illustrated, is closed to permit the call signal after passing through the filter 1 to be entered into the call income detecting circuit, and during the conversation state, that is, when the handset is off-hook, the contact 2a is closed to send speech signals from the telephone lines $L_1$ and $L_2$ into the internal speech lines $L_3$, $L_4$ directly. The call incoming detecting circuit 3 detects the call signal sent from the telephone lines $L_1$ and $L_2$ and sends out the call incoming detecting signal B.

The dial pulse sending circuit 8, which sends dial pulse signals to the telephone lines $L_1$ and $L_2$, is located on the more inside of the equipment than the connecting point of the telephone line $L_2$ with the call income detecting circuit 3. The dial pulse sending circuit 8 is controlled by the dial sending control signal c sent out from the controller 19 and sends out the specified dial pulse signals by ON/OFF operation. A protection circuit 18 protects various circuit elements, for example, photocouplers 6 and 7, a diode bridge circuit 5 and a constant current circuit 11, located on the more inside of equipment than above mentioned every part from the surge of high voltage, etc.

The photocouplers 6 and 7 are provided to detect the inversion of the polarity of the DC voltage between the lines $L_1$ and $L_2$. The photocoupler 6 operates to make the light receiving device 6b conductive when the line $L_2$ side is positive and the line $L_1$ side is negative. The photocoupler 7 operates to make a light receiving device 7b conductive when the line $L_1$ side is positive and the line $L_2$ side is negative. A current control resistor 20 connected to light emitting devices 6a and 7a has high resistance (e.g., 10 k$\Omega$) so that the impedance of the telephone equipment in the conversation state is not affected by the resistor 20.

The diode bridge circuit 5 makes the voltage polarities between the lines $L_1$ and $L_2$ uniform in one direction to output them to internal speech lines $L_3$ and $L_4$. By the diode bridge circuit 5, the internal speech line $L_3$ is always of positive polarity and the internal speech line $L_4$ is always of negative polarity.

The constant current circuit 11 makes the impedance of the telephone equipment from the lines $L_1$ and $L_2$ to adapt to the specified standard. A capacitor 12 removes the direct current component included in the output of the diode bridge circuit 5. A transformer 13 sends out the speech signals from the lines $L_3$ and $L_4$ through the secondary side, and sends out the speech signals from the secondary side to the internal speech lines $L_3$ and $L_4$.

The controller 19 has a NAND element 19a connected with the output of the light receiving devices 6a and 7b, the loop current detector 19b connected with the output of the NAND element 19a and the polarity inversion detector 19c connected with the output of the light receiving devices 6b and 7b. In addition, it has the hook changeover control 19d to switch over the changeover circuit 2 in response to the condition of the handset, the call income detector 19e recognizing the call incoming by receiving the output B of the call incoming signal detector circuit 3 and the dial pulse sending control 19f to control the dial pulse sending circuit 8. The loop current detector 19b recognizes, by the signal of the logic level "H" coming from the NAND element 19a, that the current flows through the direct-current loop consisting of the telephone lines $L_1$ and $L_2$, the diode bridge circuit 5, the internal speech lines $L_3$ and $L_4$ and a constant-current circuit 11, i.e., that the telephone equipment is in the conversation state. The polarity inversion detector 19c grasps which of the light receiving devices 6b and 7b is in the conductive state and recognizes the inversion of the voltage polarity between the lines $L_1$ and $L_2$. Since this polarity inversion is carried out by the telephone office at the time of charging and the end of telephone conversation, the time registering is performed on the basis of the detected information of this polarity inversion.

In the configuration as described above, when the changeover circuit 2 closes the contact 2b as illustrated and the telephone equipment is in the call waiting state, if the call signal comes from the lines $L_1$ and $L_2$, this call signal is entered to the call incoming detecting circuit 3 and the call incoming detecting signal B is sent out. Receiving this signal B, the controller 19 operates to ring a call bell.

When the handset is hooked off, the changeover circuit 2 closes the contact 2a, resulting in the conversation state of the telephone equipment. In the conversation state, if the line $L_1$ side is of positive polarity, a loop current flows from the circuit $L_1$ through the diode bridge circuit 5, the internal speech line $L_3$, the constant current circuit 11, the internal speech line $L_4$ and the diode bridge circuit 5 to the line $L_2$. At this time, a part of the loop current flows into the light emitting device 7a of the photocoupler 7, thus the light receiving device 7b becomes conductive, then the loop current detector 19b recognizes that the loop current flows and that the polarity inversion detector 19c recognizes that the line $L_1$ side is of positive polarity. If the line $L_2$ side is of positive polarity, the loop current and the positive polarity of the circuit $L_2$ side are recognized by the conductivity of the light receiving element 6b of the photocoupler 6.

In the conversation state, the voltage polarity between the lines $L_1$ and $L_2$ is inverted at every time of charging and the end of the telephone conversation. Since the direction of the loop current is changed by the polarity inversion, the conductive state of the light receiving device 6b and 7b is changed over and the polarity inversion is recognized.

In the conventional telephone line interface circuit as described above, the dial pulse sending circuit 8 is located nearer to the outside of the equipment, that is, nearer to the lines $L_1$ and $L_2$, than the photocouplers 6 and 7. The reason for this is described below. That is, assuming that the dial pulse sending circuit 8 is located nearer to the inside of equipment than the photocouplers 6 and 7, the impedance of the equipment from the lines $L_1$ and $L_2$, when the dial pulse sending circuit 8 is OFF (dial break), is determined by the resistance of the current control resistor 20. If the resistance of the resistor 20 is about 10 k$\Omega$ as described above, the impedance of the telephone equipment at the dial break is too low for the telephone office to detect the dial break, and the telephone office cannot detect the dial pulse signal sent from the dial pulse sending circuit 8. Then, to make the impedance of the telephone equipment from the lines $L_1$ and $L_2$ at the dial break at least 100 k$\Omega$, if a resistor having 100 k$\Omega$ or larger resistance is used as the resistor 20, the current sufficient to operate the photocouplers 6 and 7 cannot be supplied. Therefore, in order to solve simultaneously the above-mentioned two troubles, it is necessary to locate the dial pulse sending circuit 8 nearer to the outside of equipment outward than the photocouplers 6 and 7.

However, since the dial pulse sending circuit 8 is located nearer to the outside of equipment than the photocouplers 6 and 7, it is necessary that the dial pulse sending circuit 8 has a construction permitting a current to pass in both directions to make it possible to send out the dial pulse both for the case where the circuit $L_1$ is of positive polarity and for the case where the circuit $L_2$ is of positive polarity. Furthermore, the capability of sending out the dial pulse of high accuracy is required for the dial pulse sending circuit 8. Therefore, to meet this requirements, it is necessary to use a special relay for the dial pulse sending circuit 8, thereby resulting in such problems as increase in cost and in scale of the circuit.

The object of this invention is to provide a telephone line interface circuit which uses a low-cost and small-scale circuit as a dial pulse sending circuit.

SUMMARY OF THE INVENTION

This invention provides a telephone line interface circuit for connecting telephone equipment provided with internal speech lines having predetermined DC impedance to external telephone lines, comprising rectifying means connected with the telephone lines for rectifying the DC voltage coming from the telephone lines; dial pulse sending means which makes connection and disconnection between the output terminals of the rectifying circuit and the internal speech lines for sending dial pulses to said telephone lines; and polarity inversion detecting means which discriminates the voltage relationship between the telephone lines and the internal speech lines for detecting the polarity inversion of the DC voltage coming from the telephone lines. The voltage polarity of the internal speech lines inside the telephone equipment is constant by the effect of the rectifying circuit regardless of the voltage polarity of the telephone lines, and therefore the direction of the loop current flowing through the internal speech line is also constant. Because the dial pulse sending circuit is provided between this internal speech line and the rectifying circuit, the direction of the loop current flowing through the dial pulse sending circuit is always constant, thus allowing use of a unidirectional semiconductor switching device as the dial pulse sending circuit. As the typical unidirectional switching device is a MOS transistor of small size and low cost.

The circuit to detect the polarity inversion of telephone lines is connected between the telephone lines and the internal speech lines. Therefore, at the time of dial break, that is, when the dial pulse sending circuit is open, the impedance of the telephone equipment viewed from the telephone line becomes infinite regardless of the impedance of the polarity inversion detecting circuit. Therefore the telephone office can sufficiently recognize the dial pulses.

DESCRIPTION OF THE PREFERRED EMBODIMENT

Hereinafter, an embodiment of this invention is described with reference to the drawings.

Figure 1:
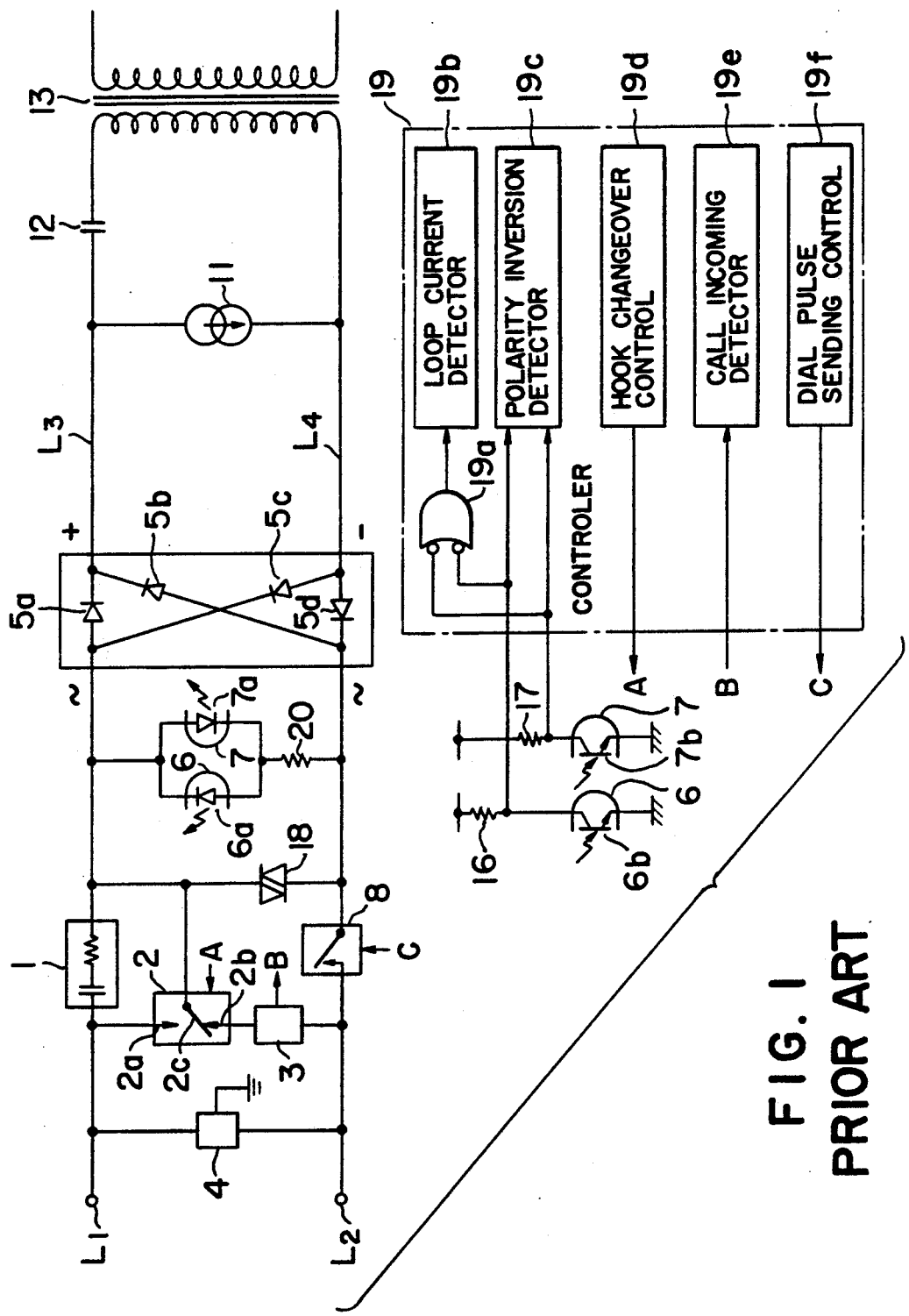
FIG. 1 is a schematic diagram illustrating the configuration of the telephone line interface circuit according to the conventional technique.
Figure 2:
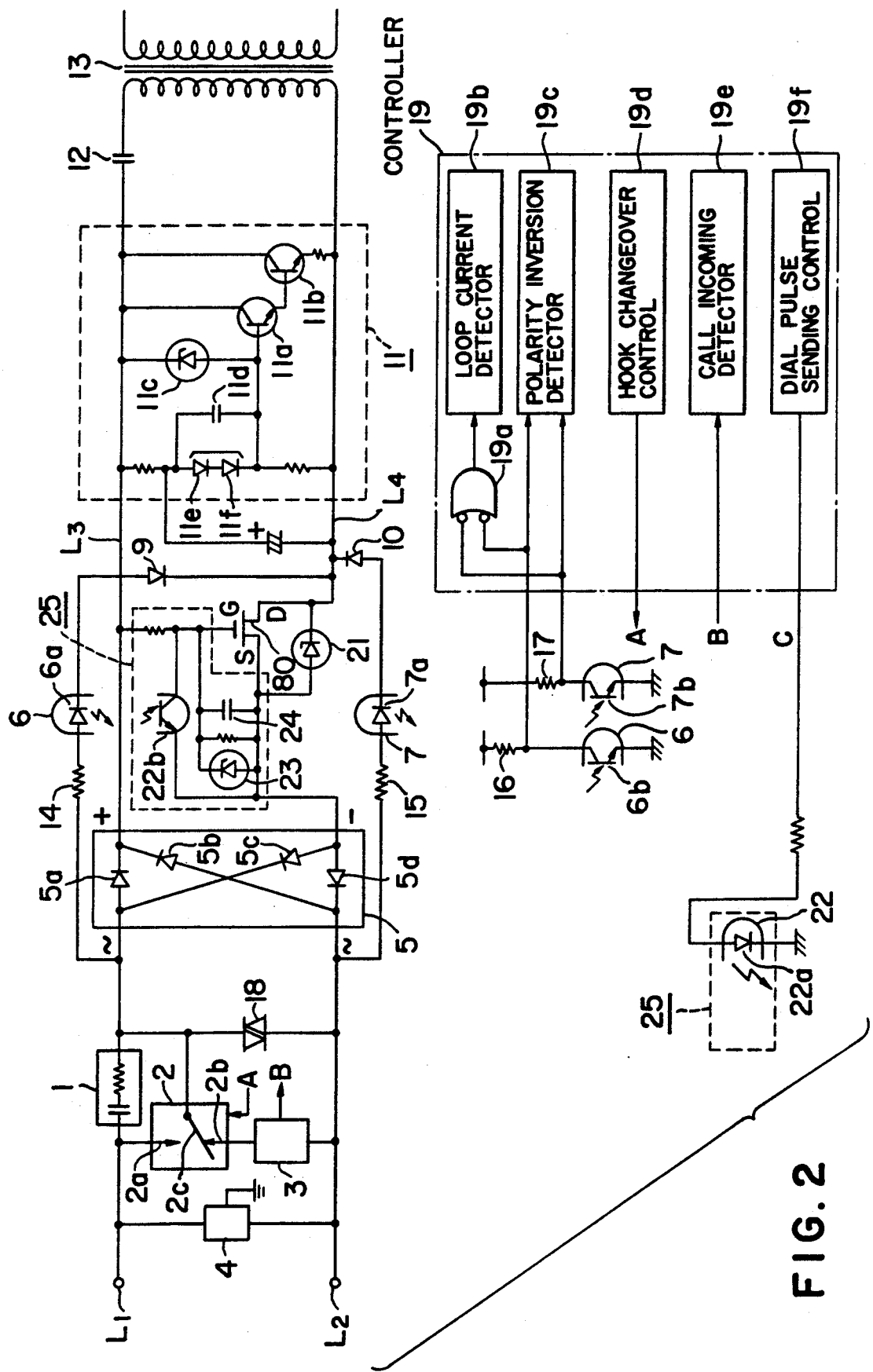
FIG. 2 is a schematic diagram illustrating the configuration of an embodiment of the telephone line interface circuit according to this invention.

FIG. 2 is a schematic diagram illustrating the configuration of the telephone line interface circuit of this invention. In FIG. 2, the same items as illustrated in FIG. 1 are indicated with the same signs and the descriptions of the same items is omitted.

In FIG. 2, a diode bridge circuit 5 composed of four diodes 5a, 5b, 5c and 5d is connected between the telephone lines $L_1$, $L_2$ and the internal speech lines $L_3$, $L_4$ of this telephone equipment, rectifies the DC voltage from the telephone lines $L_1$ and $L_2$, so that the internal speech line $L_3$ is always kept in positive polarity and the internal speech line $L_4$ always in negative polarity. The dial pulse sending circuit 80 is inserted between the negative output terminal of the diode bridge circuit 5 and the internal speech line $L_4$. The MOS transistor is used for this dial pulse sending circuit 80 in this embodiment. The Zener diode 21 connected between the drain and the source of this dial pulse sending circuit 80 protects the dial pulse sending circuit 80 from overvoltage. Further, a driving circuit 25 for dial pulse sending circuit 80 is connected to the gate G of the dial pulse sending circuit 80 to turn the dial pulse sending circuit 80 ON/OFF. This driving circuit 25 has a photocoupler 22 under the control by the controller 19, the Zener diode 23 for overvoltage protection connected between the collector and the emitter of the light receiving device 22b of the photocoupler 22 and a filter 24. In this driving circuit 25, the light emitting device 22a of the photocoupler 22 is turned ON/OFF by the dial sending control signal C sent from the controller 19, hereby the light receiving device 22b is turned ON/OFF, then the pulse voltage given to the collector of the light receiving 22b is applied to the gate of the dial pulse sending circuit 80 to turn it ON/OFF.

A series of a resistance 14 for current control, a light emitting device 6a of the photocoupler 6 and a high-voltage diode 9 for reverse current prevention are connected between the telephone line $L_1$ and the internal speech line $L_4$. Similarly, a series of a resistor 15 for current control, the light emitting device 7a of the photocoupler 7 and a high-voltage diode 10 are connected between the telephone line $L_2$ and the internal speech line $L_4$. The light emitting device 6a of the photocoupler 6 is energized and makes the light receiving device 6b conductive when the line $L_1$ is of positive polarity and the light emitting device 7a of the photocoupler 7 is energized and makes the light receiving element 7b conductive when the line $L_2$ is of positive polarity. These light receiving devices 6b and 7b of the photocouplers 6 and 7 are connected to the controller 19 in the same way as conventional equipment, and the loop current and the polarity inversion are detected by these output voltages.

The constant current circuit 11 connected between the internal speech lines $L_3$ and $L_4$ is a circuit to conform the DC impedance of the telephone equipment viewed from the lines $L_1$ and $L_2$ to the predetermined Standard. This constant current circuit 11 has two transistors 11a and 11b in Darlington connection. To keep the base voltage of the first-stage transistor 11a constant, the Zener diode 11c and two diodes 11e and 11f connected in series are provided and the capacitor 11d is fitted to prevent oscillation.

In the above-described configuration, when the handset is off-hooked, the changeover circuit 2 closes the contact 2a in contrast with the illustration, thus bringing the telephone equipment into the conversation state. Now in this state, assuming that the dial pulse sending circuit 80 is maintained in the ON state by the dial sending control signal C sent from the controller 19, if the line $L_1$ is of positive polarity, the direct loop current flows from the line $L_1$ through the changeover circuit 2, the diode bridge circuit 5, the internal speech line $L_3$, the constant current circuit 11, the dial pulse sending circuit 80 and the diode bridge circuit 5 to the line $L_2$. At this time, since a part of the direct loop current flows from the line $L_1$ through the resistor 14, the light emitting device 6a and the diode 9 to the internal speech line $L_4$, the light emitting device 6a is driven by this current. Thereby the light receiving device 6b is made conductive, then the direct loop current detector 19b of the controller 19 detects the loop current and the polarity inversion detector 19c recognizes the voltage polarity of the telephone lines $L_1$ and $L_2$.

When the polarity of the telephone lines $L_1$ and $L_2$ is inverted and the polarity of the line $L_2$ becomes positive, the direct loop current flows from the line $L_2$ through the diode bridge circuit 5, the internal speech line $L_3$, the constant current circuit 11, the internal speech line $L_4$, the dial pulse sending circuit 80, the diode bridge circuit 5 and the changeover circuit 2 to the line $L_1$. At this time, since a part of the direct loop current flows from the line $L_2$ through the resistor 15, the light emitting device 7a and the diode 10 to the internal speech line $L_4$, the light emitting device 7a is driven by this current, and the light receiving device 7b is made conductive, then the direct loop current detector 19b of the controller 19 detects the loop current and the polarity inversion detector 19c recognizes the polarity inversion of the voltage of the telephone lines $L_1$ and $L_2$.

As understood from the above description, regardless of the voltage polarity of the telephone lines $L_1$ and $L_2$, the direct loop current flowing through the internal speech lines $L_3$ and $L_4$ flows always in one direction, i.e. from the drain to the source of the MOS transistor of the dial pulse sending circuit 80. Therefore, the dial pulse sending circuit 80 does not require a special relay durable against the current in both directions as used for the conventional dial pulse sending circuit 8, thus enabling use of a semiconductor switching device such as a MOS transistor in this embodiment.

Next, in the case where the dial pulse is sent out, the contact 2a of the changeover circuit 2 is closed and the loop current flows through one of the above-mentioned direct current loops according to the voltage polarity of the lines $L_1$ and $L_2$.

When the photocoupler 22 is turned ON/OFF by the control signal C from the controller 19, the dial pulse sending circuit 80 is broken/connected to turn the direct current loop OFF/ON, sending the dial pulses to the line $L_1$ and $L_2$. In this case, when the dial pulse sending circuit 80 is open, that is, when in dial break, since the direct current loop is open, the DC impedance of the telephone equipment viewed from the lines $L_1$ and $L_2$ becomes almost infinite regardless of the resistance of the resistor 14 and 15. Therefore, the telephone office can recognize sufficiently the dial pulse.

As understood from the above embodiment, this invention permits use of a unidirectional switching device, particularly a semiconductor device of low cost and small size, for the dial pulse sending circuit. Therefore, it is possible to provide the telephone line interface circuit of low cost and small size.

What is claimed is:

1. A telephone line interface circuit for connecting telephone equipment having internal speech lines with predetermined DC impedance to external telephone lines, comprising:

rectifying means connected with the telephone lines for rectifying DC voltage coming from the telephone lines;

dial pulse sending means, which makes connection and disconnection between output terminals of said rectifying means and the internal speech lines, for sending dial pulses to the telephone lines; and polarity inversion detecting means, which discriminates the voltage relationship between the telephone lines and the internal speech lines, for detecting the polarity inversion of the DC voltage coming from the telephone lines, the polarity inversion detecting means being connected between the telephone lines and one of the internal speech lines.

2. A telephone line interface circuit as defined in claim 1, wherein said dial pulse sending means comprises a unidirectional semiconductor switching device connected between one of the output terminals of said rectifying means and corresponding one of the internal speech lines, and drive means for driving said semiconductor switching device to turn ON/OFF.

3. A telephone line interface circuit as defined in claim 2, wherein said semiconductor switching device is a MOS transistor.

4. A telephone line interface circuit as defined in claim 1, wherein said polarity inversion detecting means comprises the first discriminating means for discriminating the voltage relationship between one of the telephone lines and one of the internal speech lines, and the second discriminating means for discriminating the voltage relationship between the other one of the telephone lines and said one of the internal speech lines.

5. A telephone line interface circuit as defined in claim 4, wherein said first discriminating means is a first photocoupler whose light emitting device is connected between said one of the telephone lines and said one of the internal speech lines, and said second discriminating means is a second photocoupler whose light emitting device is connected between the other one of the telephone line and said one of the internal speech line.

* * * * *